United States Patent
Shahar et al.

(10) Patent No.: US 7,582,878 B2
(45) Date of Patent: Sep. 1, 2009

(54) METHOD, APPARATUS, AND SYSTEM OF ELECTRIC-SIGNAL DETECTION BY ASYNCHRONOUS DEMULTIPLEXING

(75) Inventors: Arie Shahar, Moshave Magshimim (IL); David Braginsky, Ashdod (IL); Daniel Shalom, Rishon Le Zion (IL); Uri El-Hanany, Rehovot (IL); Zeev Gutman, Kfar Mordechi (IL)

(73) Assignee: Orbotech Medical Solutions Ltd., Rehovot (IL)

( * ) Notice: Subject to any disclaimer, the term of this patent is extended or adjusted under 35 U.S.C. 154(b) by 79 days.

(21) Appl. No.: 12/014,816

(22) Filed: Jan. 16, 2008

(65) Prior Publication Data

US 2008/0169422 A1 Jul. 17, 2008

Related U.S. Application Data

(60) Provisional application No. 60/880,892, filed on Jan. 16, 2007.

(51) Int. Cl.
*H01L 25/00* (2006.01)
(52) U.S. Cl. ................................. 250/370.09
(58) Field of Classification Search ........................ 250/370.01–370.15; 378/98.8
See application file for complete search history.

(56) References Cited

U.S. PATENT DOCUMENTS

2007/0278387 A1 12/2007 Shalom et al.
2008/0001095 A1* 1/2008 Astley et al. ........... 250/370.09

OTHER PUBLICATIONS

Perenzoni et al, "A multi-spectral analog photon counting readout circuit for x-ray hybrid pixel detectors,", 2006, IEEE, Instrumentation and Measurement Technology Conference, pp. 2003-2006.*

* cited by examiner

*Primary Examiner*—David P Porta
*Assistant Examiner*—Kiho Kim
(74) *Attorney, Agent, or Firm*—Shiloh Buchek PLLC

(57) ABSTRACT

Some embodiments include methods, devices and systems of radiation detection by asynchronous demultiplexing. In some embodiments, an apparatus to read a plurality of electrical signals received from an electrode may include two or more electrical signal readers, wherein each of the signal readers is individually switchable between a coupled state in which an input of the signal reader is coupled to the electrode, and a decoupled state in which the input is decoupled from the electrode; and a controller to detect the plurality of electrical signals, to selectively switch the two or more signal readers to the coupled state to receive at least one sequence of two or more of the detected electrical signals, respectively, and to selectively activate the two or more signal readers to process the two or more detected electrical signals, respectively. Other embodiments are described and claimed.

37 Claims, 5 Drawing Sheets

METHOD, APPARATUS, AND SYSTEM OF ELECTRIC-SIGNAL DETECTION BY ASYNCHRONOUS DEMULTIPLEXING

CROSS REFERENCE

This application claims the benefit of U.S. Provisional Patent Application No. 60/880,892 filed on Jan. 16, 2007 and entitled "Radiation Detection By Asynchronous Demultiplexing", the entire disclosure of which is incorporated herein by reference.

FIELD

Some embodiments relate to electric signal detectors, and in particular to photon counting detectors in the field of medical imaging.

BACKGROUND

A semiconductor radiation detector may be used to detect photons for medical imaging systems. Photons of ionizing radiation, e.g., X-ray or gamma ray radiation, are absorbed by a semiconductor and generate measurable electric charge, which may be collected by anodes deposited on the semiconductor. The electric charge collected by the anodes may be read and converted into electric signals by readout circuits coupled to the anodes. The energy of the absorbed photon is measured according to the energy level of the electric signals, and the location of absorption of the photon corresponds to the location of the anodes collecting the electric charge. The energy level and location of the absorbed photons are used for image reconstruction.

Unfortunately, in some cases the radiation flux may be too high for the readout circuit to distinguish between individual photons. For example, when the measured radiation flux is relatively high and the area of the anode is relatively small. This may adversely affect the quality of the reconstructed image.

SUMMARY

Some embodiments provide a method, apparatus, and/or system of radiation detection by asynchronous demultiplexing.

Some embodiments enable a radiation detector to distinguish between individual photons for an anode that receives high flux levels.

Some demonstrative embodiments include a photon counting radiation detection system, which may include at least one radiation detector including an array of anodes to generate a plurality of electrical signals in response to absorbing photons of ionizing radiation; an array of electrical signal detectors to read the plurality of electrical signals; and a readout system to generate an output corresponding to the radiation based on an output of the array of electrical signal detectors. At least one of the electrical signal detectors may include two or more electrical signal readers, wherein each of the signal readers is individually switchable between a coupled state in which an input of the signal reader is coupled to the electrode, and a decoupled state in which the input is decoupled from the electrode; and a controller to detect the plurality of electrical signals, to selectively switch the two or more signal readers to the coupled state to receive at least one sequence of two or more of the detected electrical signals, respectively, and to selectively activate the two or more signal readers to process the two or more detected electrical signals, respectively.

In some demonstrative embodiments, the controller is to detect a signal to be read by a first signal reader of the two or more signal readers, which is at the coupled state; and, at the end of a predefined time period after detecting the signal, to switch the first signal reader from the coupled state to the decoupled state and to switch a second signal reader of the two or more signal readers from the decoupled state to the coupled state.

In some demonstrative embodiments, the controller is to deactivate the first signal reader at the end of a predefined time period after switching the first signal reader to the decoupled state.

In some demonstrative embodiments, the controller is to activate the second signal reader at the end of a predefined switching time period after coupling the second signal reader.

In some demonstrative embodiments, the two or more electrical signal readers may include n readers, and the controller may be capable of cyclically switching the n signal readers to the coupled state according to a predefined switching sequence, such that each of the n readers is to sequentially read a first electrical signal of the sequence of electrical signals and a second electrical signal of a consecutive sequence of the detected electrical signals.

In some demonstrative embodiments, a number of the two or more signal readers is equal to or greater than a ratio between a flux of the plurality of electrical signals received from the electrode and a reading time of each of the signal readers.

In some demonstrative embodiments, at least one signal reader of the signal readers may include a signal readout circuit including a charge-sensitive amplifier to be switchably coupled to the input via a switchable gate; and a shaper coupled to an output of the amplifier.

In some demonstrative embodiments, a number of the two or more signal readers may be equal to or greater than a ratio between a flux of the plurality of electrical signals received from the electrode and a time constant of the shaper.

In some demonstrative embodiments, the two or more signal readers are coupled to a common output.

In some demonstrative embodiments, the system may include a medical imaging system.

In some demonstrative embodiments, the radiation may include X-ray or Gamma radiation.

Some demonstrative embodiments include an apparatus to read a plurality of electrical signals received from an electrode. The apparatus may include two or more electrical signal readers, wherein each of the signal readers is individually switchable between a coupled state in which an input of the signal reader is coupled to the electrode, and a decoupled state in which the input is decoupled from the electrode; and a controller to detect the plurality of electrical signals, to selectively switch the two or more signal readers to the coupled state to receive at least one sequence of two or more of the detected electrical signals, respectively, and to selectively activate the two or more signal readers to process the two or more detected electrical signals, respectively.

In some demonstrative embodiments, the controller is to detect a signal to be read by a first signal reader of the two or more signal readers, which is at the coupled state; and, at the end of a predefined time period after detecting the signal, to switch the first signal reader from the coupled state to the decoupled state and to switch a second signal reader of the two or more signal readers from the decoupled state to the coupled state.

In some demonstrative embodiments, the controller is to deactivate the first signal reader at the end of a predefined time period after switching the first signal reader to the decoupled state.

In some demonstrative embodiments, the controller is to activate the second signal reader at the end of a predefined switching time period after switching the second signal reader to the coupled state.

In some demonstrative embodiments, the two or more electrical signal readers include n readers, and the controller is to cyclically switch the n signal readers to the coupled state according to a predefined switching sequence, such that each of the n readers is to sequentially read a first electrical signal of the sequence of electrical signals and a second electrical signal of a consecutive sequence of the detected electrical signals.

In some demonstrative embodiments, the first and second electrical signals are separated by n electrical signals.

In some demonstrative embodiments, a number of the two or more signal readers is equal to or greater than a ratio between a flux of the plurality of electrical signals received from the electrode and a reading time of each of the signal readers.

In some demonstrative embodiments, at least one signal reader of the signal readers may include a signal readout circuit including a charge-sensitive amplifier to be switchably coupled to the input via a switchable gate; and a shaper coupled to an output of the amplifier.

In some demonstrative embodiments, a number of the two or more signal readers is equal to or greater than a ratio between a flux of the plurality of electrical signals received from the electrode and a time constant of the shaper.

In some demonstrative embodiments, the signal reader may include a reset switch connected in parallel to the charge-sensitive amplifier, and wherein the controller is to switch the signal reader to the coupled state by closing the gate, and to activate the signal reader by opening the reset switch.

In some demonstrative embodiments, the two or more signal readers are coupled to a common output.

In some demonstrative embodiments, the apparatus may include a radiation detector including an array of anodes, wherein the electrode may include an anode of the array of anodes.

In some demonstrative embodiments, the radiation detector may include a radiation detector to detect an ionizing radiation selected from the group consisting of X-ray radiation and Gamma ray radiation.

In some demonstrative embodiments, the radiation detector may include a single photon counting semiconductor radiation detector.

In some demonstrative embodiments, the semiconductor radiation detector may include cadmium zinc telluride.

Some demonstrative embodiments include a method of reading a plurality of electrical signals received from an electrode of a radiation detector. The method may include detecting the plurality of electrical signal; and individually reading at least one sequence of two or more of the detected electrical signals by two or more electrical signal readers, respectively, by selectively switching the two or more electrical signal readers between a coupled state in which an input of the signal reader is coupled to the electrode and a decoupled state in which the input is decoupled from the electrode, and selectively activating the two or more signal readers to process the two or more detected signals, respectively.

In some demonstrative embodiments, the method may include detecting a signal to be read by a first signal reader of the two or more signal readers, which is at the coupled state; and, at the end of a predefined time period after detecting the signal, switching the first signal reader from the coupled state to the decoupled state and switching a second signal reader of the two or more signal readers from the decoupled state to the coupled state.

In some demonstrative embodiments, the method may include deactivating the first signal reader at the end of a predefined time period after switching the first signal reader to the decoupled state.

In some demonstrative embodiments, the method may include activating the second signal reader at the end of a predefined switching time period after switching the second signal reader to the coupled state.

In some demonstrative embodiments, the two or more electrical signal readers include n readers, and the selectively switching may include cyclically switching the n signal readers to the coupled state according to a predefined switching sequence, such that each of the n readers is to sequentially read a first electrical signal of the sequence of electrical signals and a second electrical signal of a consecutive sequence of the detected electrical signals.

In some demonstrative embodiments, the first and second electrical signals are separated by n electrical signals.

In some demonstrative embodiments, a number of the two or more signal readers is equal to or greater than a ratio between a flux of the plurality of electrical signals received from the electrode and a reading time of each of the signal readers.

In some demonstrative embodiments, the reading may include using a shaper, and wherein a number of the two or more signal readers is equal to or greater than a ratio between a flux of the plurality of electrical signals received from the electrode and a time constant of the shaper.

In some demonstrative embodiments, the electrode may include an anode of an array of anodes of a radiation detector.

In some demonstrative embodiments, the radiation detector may include a single photon counting semiconductor radiation detector.

In some demonstrative embodiments, the semiconductor radiation detector may include cadmium zinc telluride.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Further, reference numerals may be repeated among the figures or within a figure to indicate corresponding or analogous elements. Moreover, some of the blocks depicted in the drawings may be combined into a single function. The figures are listed below.

DETAILED DESCRIPTION

In the following detailed description, numerous specific details are set forth in order to provide a thorough understanding of some demonstrative embodiments. However, some embodiments may be practiced without these specific details. In other instances, well-known methods, procedures, components, units and/or circuits have not been described in detail so as not to obscure the discussion. It is intended that the embodiments and figures disclosed herein be considered illustrative rather than restrictive.

Portions of the discussion herein utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used herein to describe two or more items; for example, a plurality of items includes two or more items.

Figure 1:
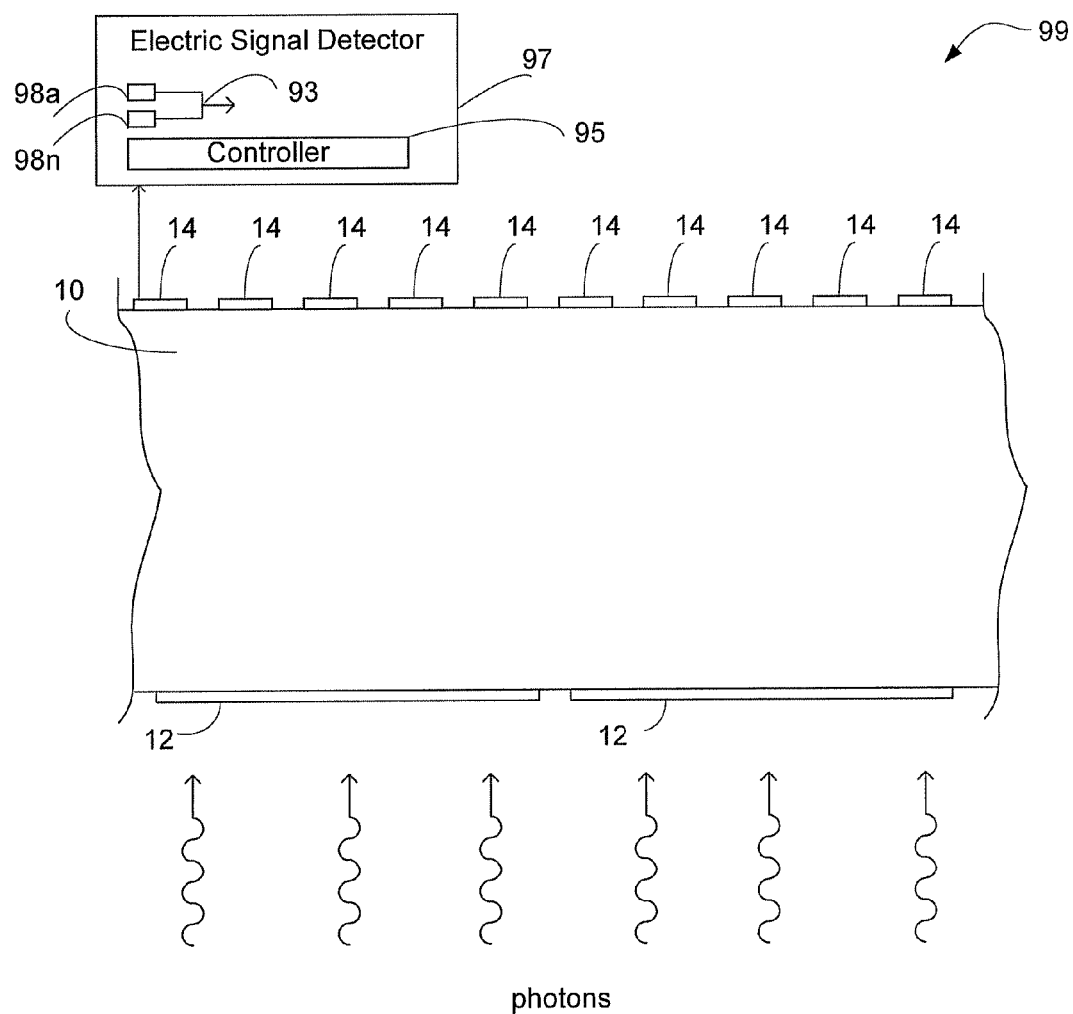
FIG. 1 is a schematic cross-section diagram of a semiconductor radiation detector in accordance with some demonstrative embodiments.

FIG. 1 schematically illustrates, in cross-section, a semiconductor radiation detector 99 according to some demonstrative embodiments. Detector 99 includes a semiconducting sheet 10 having a plurality of electrodes 12 and 14 coupled thereto. Electrodes 12 include one or more cathodes 12 coupled to one side of sheet 10; and a plurality of anodes 14 coupled to an opposite side of sheet 10. In one non-limiting example, sheet 10 may be produced from cadmium-zinc-telluride (CdZnTe or "CZT"), or from any other suitable semiconductor material capable of detecting ionizing radiation, such as silicon and/or germanium.

In operation of detector 99, photons of radiation are absorbed by sheet 10 to form electrons and holes. The electrons and holes drift to anodes 14 and cathodes 12, respectively, generating measurable electrical signals on anodes 14 and cathodes 12. A level of the electric signals may provide a measure of the energy of the absorbed photon, and/or the location of absorption of the photon may correspond to the location of the anodes generating the signal. The energy level and location of the absorbed photons may be used for image reconstruction. For example, detector 99 may be part of a pixilated detector, with an array of detector elements 99 arranged in a grid layout that corresponds to pixels of the reconstructed image. Accordingly, anodes 14 may also be referred to herein as pixels 14.

If the measured radiation flux is high, for example, of the order of at least $10^8$ photons (events) per second per square-millimeter, then for an anode having an area of the order of 1 $mm^2$, the radiation flux may be too high for a conventional readout circuit coupled to the anode to distinguish between individual photons.

Although embodiments are not limited in this respect, in the following description, unless otherwise stated, anodes 14 may be assumed by way of example to receive of the order of $10^8$ events per second. In other embodiments, radiation received by anodes 14 may include radiation of any other suitable flux, e.g., lower or higher than $10^8$ events per second.

In some embodiments, detector 99 may include an electric signal detector 97 coupled to anode 14 to detect ionizing radiation such as, high flux X-ray or gamma ray radiation, generating electrical signals at anode 14, e.g., by single photon counting. Electrical signal detector 97 may be capable of distinguishing between individual photons of a high flux radiation, e.g., of an order of at least of $10^8$ events per second, which may be received by anode 14, resulting in a reconstructed image at a relatively high level of reliability, e.g., as described herein.

In some demonstrative embodiments, electric signal detector 97 may include a plurality of electrical signal readers 98, e.g., n electrical signal readers denoted 98a . . . 98n, coupled to a common output 93. Each of readers 98 may be individually switchable between a first ("coupled") state in which an input of the reader is coupled to anode 14 to receive a detected signal from anode 14, and a second ("decoupled") state in which the input of the reader is decoupled from anode 14, e.g., as described below. Each of readers 98 may also be individually activated, for example, when the reader is at the coupled and/or decoupled states, to processes the received signal, e.g., as described below.

In some demonstrative embodiments, electric signal detector 97 may also include a switching controller 95 to detect the electrical signals generated by anode 14, and to selectively switch signal readers 98 to the coupled state and/or to selectively activate signal readers 98, thereby to read at least one sequence of two or more of the detected electrical signals by signal readers 98, respectively, e.g., as described in detail below.

Figure 2:
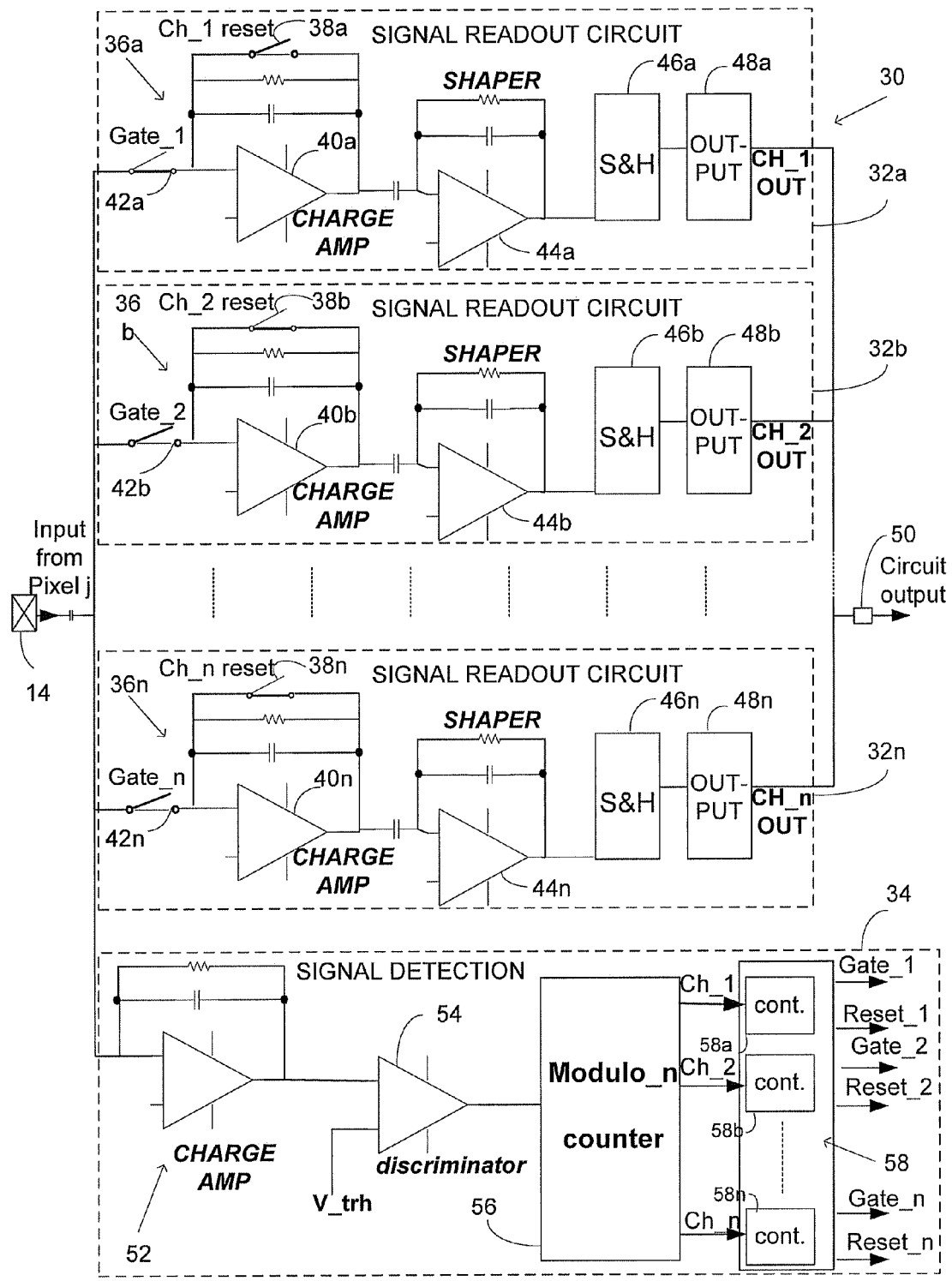
FIG. 2 is a schematic diagram of an electric signal detector in accordance with some demonstrative embodiments.

FIG. 2 schematically illustrates an electric signal detector circuit 30 in accordance with some demonstrative embodiments. Although embodiments of the invention are not limited in this respect, in some demonstrative embodiments circuit 30 may perform the functionality of electric signal detector 97 (FIG. 1), to detect signals from anode 14 of radiation detector 99 (FIG. 1). In some embodiments, a pixilated radiation detector, such as detector 99 (FIG. 1), may have one or more detectors substantially similar to circuit 30 coupled to one or more respective anode 14. Accordingly, anode 14 is also referred to herein as pixel j of the pixilated radiation detector 99 (FIG. 1).

Circuit 30 includes a signal detection circuit 34 and a plurality of n signal readout circuits 32, wherein n is a positive integer equal to or greater than 2. In one non-limiting example, the value of n may be of the order of 10, although the value of n may be selected according to characteristics of each circuit 32 and according to an expected radiation flux, as is described in more detail below.

Although embodiments of the invention are not limited in this respect, in some demonstrative embodiments signal readout circuits 32 may perform the functionality of electric signal readers 98 (FIG. 1); and/or signal detection circuit 34 may perform the functionality of switching controller 95 (FIG. 1), e.g., as described below.

In some demonstrative embodiments, each circuit 32 is able to operate as a channel conveying an input signal from pixel j to a common output terminal 50 of circuit 30. The individual circuits 32 are labeled as 32a, 32b, . . . 32n and are also termed herein channel 1, channel 2, . . . channel n, respectively.

In some demonstrative embodiments, signal detection circuit 34 may controllably switch readout circuits 32 between first and second states of operation, e.g., as described in detail below.

In some demonstrative embodiments, one or more of readout circuits 32, e.g., each of readout circuits 32, may include a charge amplifier circuit 36, a shaper 44, a sample and hold circuit 46, and an output stage 48. One or more of charge amplifier circuits 36, e.g., each of charge amplifier circuits 36, may include a reset switch 38 and a charge amplifier element 40. One or more of readout circuits 32, e.g., each of readout circuits 32, may also include a gate switch 42 to control whether the electrical input signal from pixel j is passed to the channel corresponding to readout circuit 32. Elements of the individual readout circuits 32a-32n are correspondingly labeled with respective letter designations.

In some demonstrative embodiments, one or more of readout circuits 32, e.g., each of readout circuits 32, may be switchable between a first ("coupled") state, in which the readout circuit is coupled to receive the electrical input signal from pixel j; and a second ("decoupled") state, in which the readout circuit is decoupled from the electrical input signal, e.g., as described in detail below. One or more of readout circuits 32, e.g., each of readout circuits 32, may also be selectively activated, e.g., when at the coupled and/or decoupled states, to process the received signal, e.g., as described in detail below.

In some demonstrative embodiments, circuit 36 may be coupled to receive a signal from pixel j, for example, when gate switch 42 between pixel j and the charge amplifier input is closed. Circuit 36 may be decoupled from pixel j, for example, when gate switch 42 between pixel j and the charge amplifier input is open.

The output of charge amplifier circuit 36 is passed via shaper 44, sample and hold circuit 46, and output stage 48 to output terminal 50. Output stage 48 may be, for example, an analog-to-digital (A/D) converter, a multiple threshold comparator, or the like.

In some demonstrative embodiments, each of circuits 32 may be selectively activated to process the signal received from pixel j, e.g., by selectively opening reset switch 38. For example, circuit 32 may be activate to process the received signal, when reset switch 38 is open, thereby allowing shaper 44 to receive the output of amplifier circuit 36. Circuit 32 may be deactivated by closing reset switch 38. For example, as shown in FIG. 2, circuit 32a is in the coupled state, e.g., since gate 42a is closed, whereas circuit 32b and circuit 32n are in the decoupled state, since gates 42b and 42n are open. In addition, as shown in FIG. 2, circuit 32a is active, e.g., since reset switch 38a is open, whereas circuits 32b and 32n are inactive, e.g., since reset switches 38b and 38n are closed.

In some demonstrative embodiments, a circuit of circuits 32 may be active when the circuit is in the coupled and/or decoupled states. For example, channel 1 may be activated, e.g., by opening reset switch 38a, for example, after receiving a signal via closed gate 42a, and may continue to be active as long as reset switch 38a is open, e.g., even after channel 1 is decoupled by opening gate 42a, as described below. According to this example, the capacitor of charge sensitive amplifier 36 may be charged, e.g., when gate 42a is closed, and may provide an input signal to shaper 44a, e.g., even after gate 42a is opened. Accordingly, shaper 44a may continue to process the electric signal received from pixel j even after channel 1 is decoupled from pixel j. Shaper 44a may continue to process the received signal after the decoupling of channel 1, e.g., until, reset switch 38a is closed.

In some demonstrative embodiments, reset switch 38a may be closed just before the arrival of another electric signal, e.g., of a successive sequence of signals, to be processed by channel 1, e.g., as described below. Accordingly, shaper 44a may continue to process the received signal, even when other channels are coupled to pixel j and/or process other signals received from pixel j. Therefore, shaper 44a may be allowed to have relatively long processing time, which may result in an improved the Signal-to-Noise-Ratio (SNR).

In some demonstrative embodiments, shaper 44 may be the "slowest" element among the elements of circuit 32, e.g., since shaper 44 may a long response time compared to other elements of readout circuit 32, as described below. Accordingly, the rate in which the shaper 44 operates may be selected to be approximately the rate of flux received at pixel j, divided by the number n of electronic channels 32, e.g., as described below. In one example, shaper 44 may operate at an appropriate rate, e.g., to handle approximately 1 events per second, to accommodate a relatively high flux rate of $10^8$ events per second at pixel j, e.g., if n is of the order of 10.

In some demonstrative embodiments, signal detection circuit 34 may selectively couple and/or activate readout circuits 32, e.g., as described in detail below.

In some demonstrative embodiments, detection circuit 34 may include a charge amplifier 52, a comparator 54, a modulo n counter 56, and a switching control 58, e.g., including n switching controls 58a-58n.

In accordance with some demonstrative embodiments, charge amplifier 52 may be configured to operate at the expected rate of radiation flux at anode 14. For example, in the example described herein, charge amplifier 52 may be configured to operate at the relatively high rate of $10^8$ events per second. The output of amplifier 52 is transferred to comparator 54, which acts as an event discriminator. By comparing the output of amplifier 52 with a preset threshold voltage level, denoted V_trh, comparator 54 may determine if an event has occurred at anode 14. Comparator 54 may output a predefined signal, e.g., a "true" level, to counter 56, for example, each time an event is detected by comparator 54.

In some demonstrative embodiments, counter 56 may include a modulo n counter, which acts to cyclically switch channels 1-n, i.e., signal readout circuits 32a-32n, via switching control 58. In some embodiments, counter 56 and switching control 58 may be configured such that at any given time only one channel of channels 32 is coupled to pixel 14, and all other channels 32 are decoupled from that pixel. Counter 56 and switching control 58 may also selectively activate one or more of circuits 32 to process the signals received by the n channels, e.g., as described herein. In one example, two or more of the n channels may be active simultaneously to allow processing of the received signals during a time period longer than an average time between the electric signals received from pixel 14, e.g., as described herein. For example, FIG. 2 illustrates the situation when channel 1 is coupled and active, e.g., since gate 42a is closed and reset switch 38a is open; and channels 2-n are decoupled and inactive, e.g., since gates 42b-42n are open and reset switches 38b-38n are closed.

Figure 3:
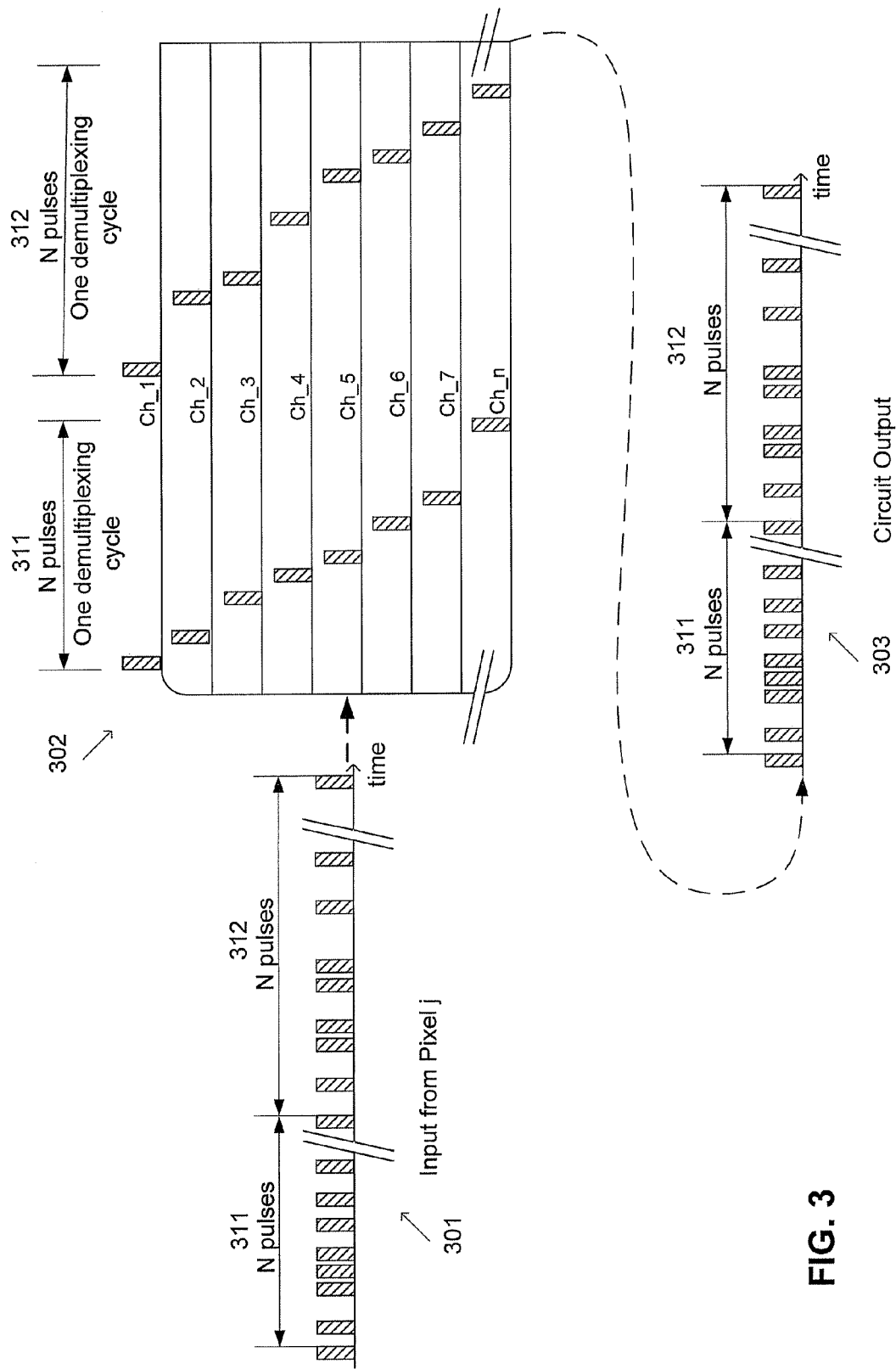
FIG. 3 is a schematic diagram with multiple timelines illustrating the timing of pulses processed by an electric signal detector in accordance with some demonstrative embodiments.

FIG. 3 schematically illustrates an input timeline 301, a processing timeline 302 and an output timeline 303 illustrating the timing of pulses processed by an electric signal detector in accordance with some demonstrative embodiments. Although embodiments of the invention are not limited in this respect, in some demonstrative embodiments timelines 301, 303, and 303 may be implemented by an electric signal detector, e.g., circuit 30 (FIG. 2), coupled to a detector element of a pixilated radiation detector, e.g., detector 99 (FIG. 1).

Timeline 301 shows a series of pulses from pixel j being input to circuit 30 (FIG. 2) in two cycles, 311 and 312. Each cycle includes a sequence of n pulses, with the time of a cycle varying according to the time of arrival of the pulses from pixel j. As shown in FIG. 3, the pulses are distributed between channels 1-n by signal detection circuit 34 (FIG. 2) of circuit 30 (FIG. 2) associated with pixel j, which may act as a demultiplexer for the incoming pulses. For example, as described above, the pulses may be distributed to the n channels cyclically, such that the first pulse of input cycle 311 is sent to channel 1, the n-th pulse of input cycle 311 is sent to channel n, and the first pulse of input cycle 312, e.g., the n+1-th pulse, is again sent to channel 1.

Each pulse may be processed within its respective channel, e.g., as described herein. For example, the processing time of a processing a pulse of cycle 311 by a channel may begin starts with the arrival the pulse into the channel, and may end just before the arrival at the channel of a next pulse from cycle 312, e.g., in order to allow a relatively long processing time for shaper 44 (FIG. 2). During the processing of the pulse of cycle 311 at a channel, other channels may be selectively coupled/decoupled and/or activated to process other respective pulses of cycle 311, e.g., as described herein. The output of each channel may be combined or multiplexed at output terminal 50 (FIG. 2) of circuit 30 (FIG. 2), giving an output that corresponds to the input received by the circuit.

As shown in FIG. 3, the cycles generated by circuit 34 (FIG. 2), e.g., cycles 311 and 312, may span unequal time periods, for example, since the stepping from channel to channel may depend on signal detection circuit 34 (FIG. 2) detecting a pulse. However, as shown in processing timeline 302, by demultiplexing the input from pixel j into n channels, the time between each pulse within a specific channel is increased, by a factor of approximately n, compared to the timing of pulses arriving at pixel j.

In some embodiments, the operation rate of shaper 44 (FIG. 2) may be determined by its peaking and/or shaping time, adjusted to improve SNR. The shaping time of shaper 44 (FIG. 2) is generally longer than the time between events generated at a given anode 14 (FIG. 2). The demultiplexing process described herein, which distributes events received at a given detector element, e.g., anode 14 (FIG. 2), into multiple channels 32 (FIG. 2), increases the time between each pulse within a specific channel 32 (FIG. 2). This allows shaper 44 (FIG. 2) to process the pulses in channel 32 (FIG. 2) at a rate that is slower than the incoming event rate produced at the given anode 14 (FIG. 2). The events processed in channels 32 (FIG. 2) are recombined at output 50 (FIG. 2) to generate an event rate that is similar to the event rate received from the given anode, as shown in output timeline 303. Accordingly, circuit 30 (FIG. 2) is able to process the events received for each anode 14 (FIG. 2), even though the processing time for each event, e.g., mainly dictated by shaper 44 (FIG. 2), is longer than the time between the events received at the anode.

In some demonstrative embodiments, the timing of the incoming pulses may be generally governed by Poisson statistics. The actual increase in timing within each channel may also generally be a function of Poisson statistics.

In some demonstrative embodiments, the number of channels n may be determined so as to allow each channel 32 (FIG. 2) of circuit 30 (FIG. 2) sufficient time to process its corresponding pulses, using one or more of the considerations described above, e.g., including the radiation flux at pixel j and/or the statistical variation of the flux.

Figure 4:
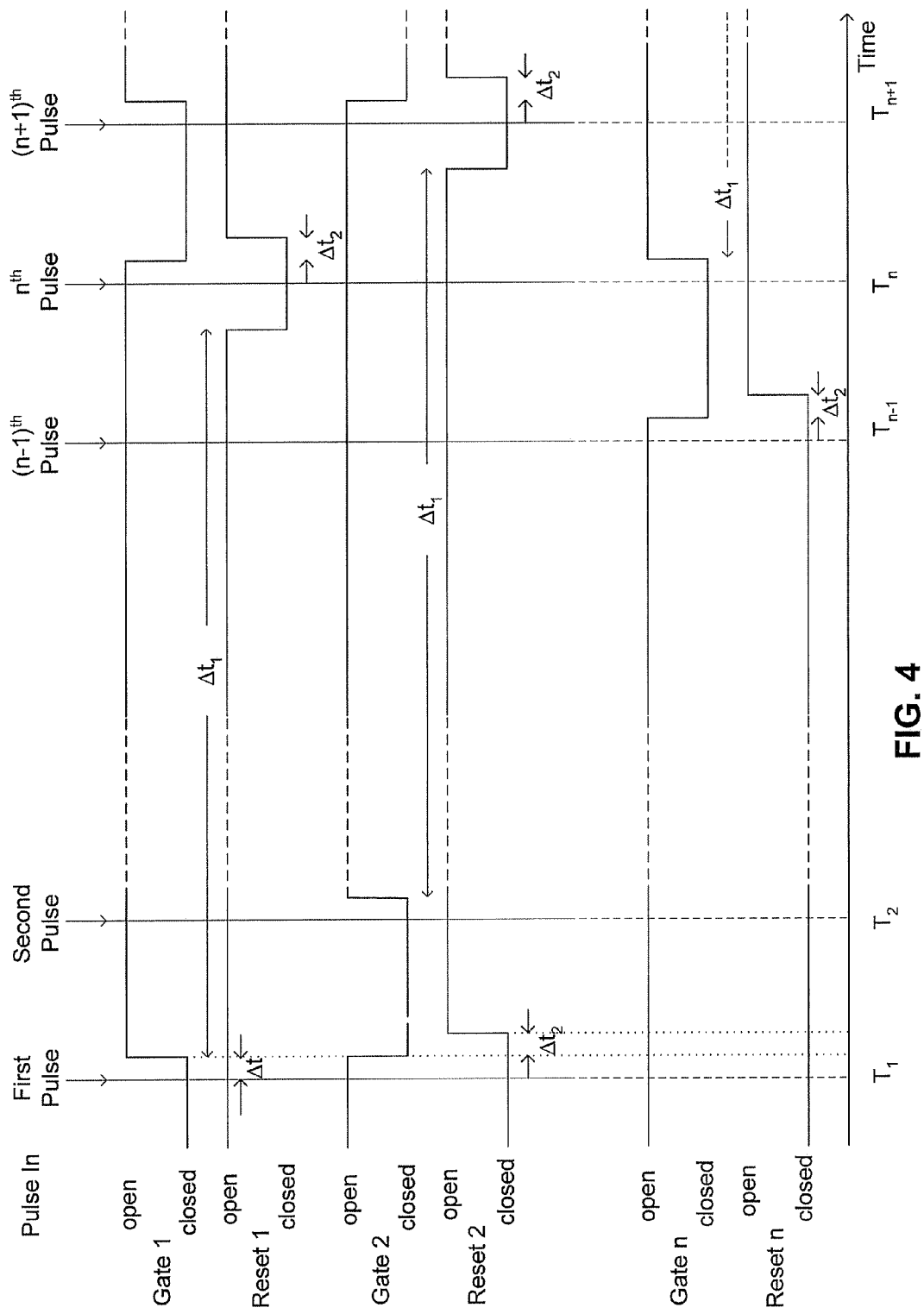
FIG. 4 is a schematic timing diagram of an electric signal detector in accordance with some demonstrative embodiments.

FIG. 4 schematically illustrates a timing diagram of an electric signal detector in accordance with some demonstrative embodiments. Although embodiments of the invention are not limited in this respect, in some demonstrative embodiments, the timing diagram of FIG. 4 may be implemented by a switching controller, e.g., signal detection circuit 34 (FIG. 2), of a detector circuit, e.g., circuit 30 (FIG. 2), coupled to a detector element, e.g., anode 14 (FIG. 1), of a pixilated radiation detector, e.g., detector 99 (FIG. 1).

The diagram of FIG. 4 shows the states of gates 1, 2 and n, e.g., gates 42a, 42b and 42n (FIG. 2), respectively, and reset switches 1, 2, and n, e.g., reset switches 38a, 38b and 38n (FIG. 2), respectively of channels 1, 2 and n, respectively, to demultiplex n+1 pulses of a demultiplexing cycle including n pulses. The states of the gates and reset switches of FIG. 4 may be controlled, for example, by the outputs of switching control 58 (FIG. 2). The initial time of the diagram of FIG. 4 corresponds to the positions of gates 1, 2, and n, and reset switches 1, 2, and n, as illustrated in FIG. 2. Thus, in this example, initially channel 1 is coupled and active, and the other n−1 channels are decoupled and inactive.

As shown in FIG. 4, at a time $T_1$, signal detection circuit 34 (FIG. 2) may detect a pulse, denoted "First Pulse". Circuit 34 (FIG. 2) may use switching controls 58 (FIG. 2) to decouple channel 1, e.g., by opening gate 1, and to couple channel 2, e.g., by closing gate 2, for example, at the end of a predefined time period, denoted $\Delta t$, after the detection of the first pulse. The opening of gate 1 and the closing of gate 2 may be performed substantially. The detected first pulse may also be received by channel 1 via closed gate 1, e.g., prior to the decoupling of channel 1. As shown in FIG. 4, reset switch 1 is already open, when channel 1 is decoupled. The time period $\Delta t$ between the detection of the first pulse and the decoupling of channel 1 may be set to be larger than a rise time of the electric signal in charge sensitive preamplifier 40 (FIG. 2), e.g., in order to allow the detection of the peak amplitude of the electric signal. Channel 1 may be deactivated by closing reset switch 1 a predefined delay time period, denoted $\Delta t_1$ after opening gate 1. The time period $\Delta t_1$ may be set to be longer than a shaping/processing time of shaper 44, e.g., to allow for shaper 44a (FIG. 2) of channel 1 to complete processing the detected electric signal. Delay time period $\Delta t_1$ may be set to be shorter than a typical demultiplexing time of n pulses, such that reset switch 1 may be closed before a next pulse from a next demultiplexing cycle arrives at channel 1.

In some demonstrative embodiments, signal detection circuit 34 (FIG. 2) may close gate 2 to couple channel 2, at the end of the time period $\Delta t$; and may open reset switch 2 at the end of a predefined buffer time period $\Delta t_2$ following the time period $\Delta t$, thus making channel 2 active and ready for receiving the second pulse only at the end of time period $\Delta t_2$. Maintaining reset switch 2 closed during the time period $\Delta t_2$, while switching gate 2 into the closed state may prevent switching noise from being transferred through channel 2. Channel 2 may continue to be active during the time period $\Delta t1$ after the decoupling of channel 2. The activation of channel 2 may end with the closing of reset switch 2. At a time $T_2$, circuit 34 (FIG. 2) may detect a second pulse, denoted "second pulse", which is to be processed by channel 2. At the end of the time period $\Delta t$ after the detection of the second pulse, circuit 34 (FIG. 2) may open gate 2 to decouple channel 2, and may close a gate 3 (not shown) to couple a channel 3 for receiving a third electronic signal. Upon detecting the second pulse, gate 2 may be already closed. Gate 2 may be switched to the open state at the end of the time period $\Delta t$ after the detection of the second pulse. Reset switch 2 of channel 2 is switched to the open state at the end of the time period $\Delta t_2$, e.g., analogously to the switching sequence described above with reference to channel 1 after detection of a pulse.

Similarly, an $(n-1)^{th}$ pulse is detected at a time $T_{n-1}$. At a time $\Delta t$ after the $(n-1)^{th}$ pulse is detected, circuit 34 (FIG. 2) may open gate (n−1) (not shown) and close gate n. Circuit 34 (FIG. 2) may open reset switch n, e.g., at the end of the buffer time $\Delta t_2$ after closing the gate n, to prevent switching noise being transferred through channel n, thus making channel n active and ready for receiving the n-th pulse. Channel (n−1) continues to be active until the end of the time period $\Delta t_1$ after the opening of gate (n−1), which corresponds to a time period $\Delta t + \Delta t_1$ after the time $T_{n-1}$. Channel (n−1) continues to be active as long as the reset switch (n–1) is open, e.g., even when gate (n–1) is open, since the capacitor of charge sensitive amplifier 40 at the input of shaper 44 is still charged with the electric charge of the electric signal. At a time $T_n$, circuit 34 (FIG. 2) may detect the $n^{th}$ pulse, which is to be processed by channel n. Upon detecting the $n^{th}$ pulse, circuit 34 (FIG. 2) may switch the gates and resets of channel n and channel 1, after the time delays described above, for example, analogously to the switching sequence described above with relation to the channels 1 and 2 after detection of a pulse, e.g., as illustrated for the "First Pulse".

It can be seen that the states of the gates and reset switches at times $T_1$ and $T_{n+1}$ for channels 1 and 2 repeat themselves. For example, states of the gates and resets in every channel 32 (FIG. 2) may repeat themselves every n pulses, corresponding to one demultiplexing cycle of a sequence of n detected electrical signal received from anode 14 (FIG. 2).

Figure 5:
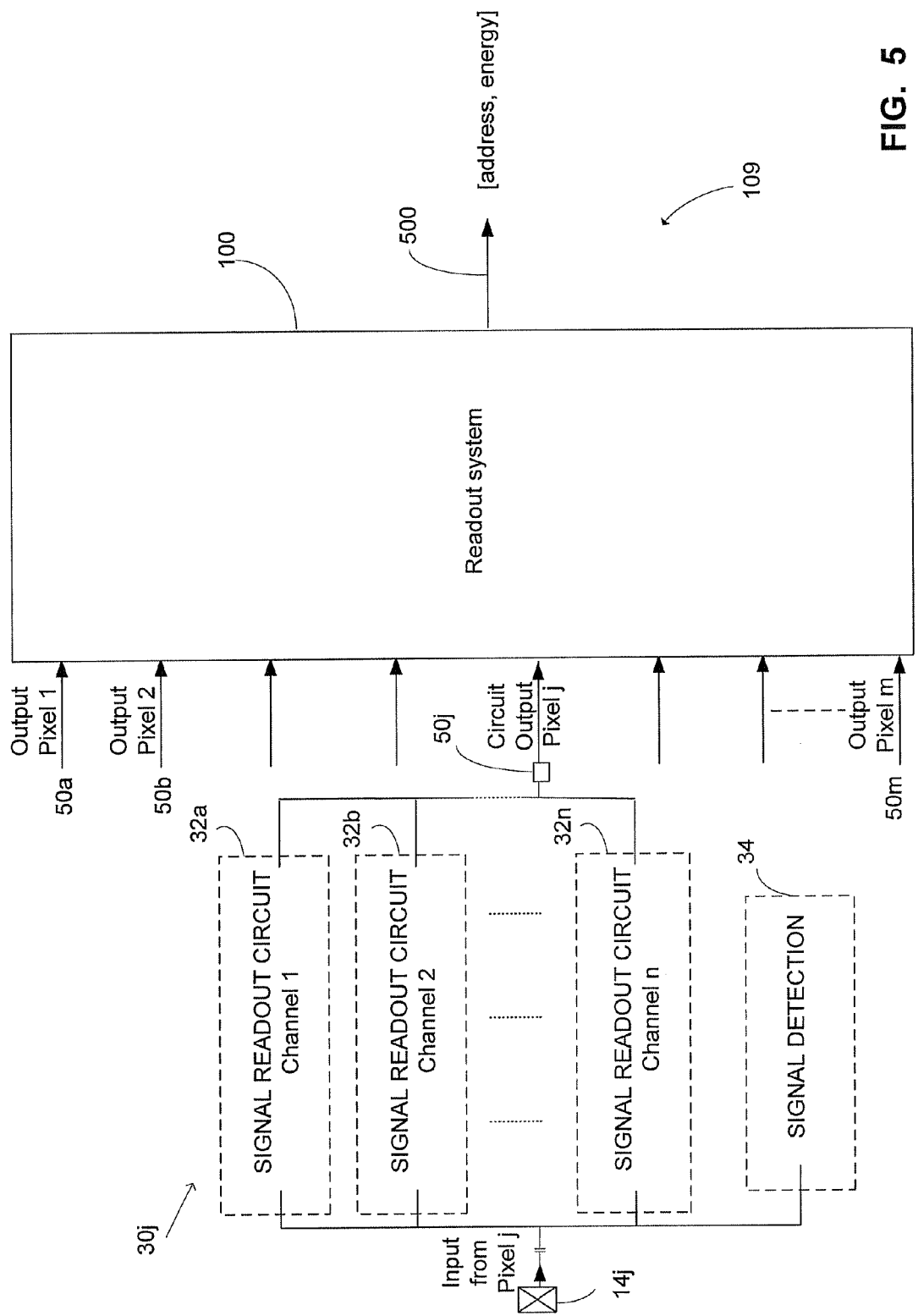
FIG. 5 is a schematic diagram of a system including a radiation detector in accordance with some demonstrative embodiments.

FIG. 5 schematically illustrates a system 109 in accordance with some demonstrative embodiments. In one non-limiting example, system 109 may include an imaging system, e.g., a medical imaging system.

System 109 including a plurality of electric signal detection circuits 30 coupled to a detector element of a pixilated radiation detector 99 (FIG. 1) Referring to FIG. 1, it is assumed that radiation detector 99 (FIG. 1) includes m anodes 14, wherein m is a positive integer. Each j-th anode of the m anodes 14 may be coupled to a respective detection circuit 30*j*, e.g., as described above with reference to FIG. 2), of m detection circuits 30. Accordingly, as shown in FIG. 5, the m detection circuits 30 may provide m respective circuit outputs 50*a*-50*m*, referred to in FIG. 5 as "Output Pixel 1", . . . "Output Pixel m", respectively.

The m outputs 50*a*-50*m* are coupled to a suitable readout system 100. In one non-limiting example, readout system 100 which may include or be generally similar to the readout system described in U.S. patent application Ser. No. 11/446,772, entitled "Digital Readout System", filed Jun. 3, 2006, and Published Dec. 6, 2007 as US Application Publication US2007/0278387 ("the '772 application") the entire disclosure of which is incorporated herein by reference.

In some demonstrative embodiments, there may be a relatively high probability to receive at readout system 100 events from different anodes 14, e.g., substantially simultaneously, for example, since the m anodes 14 may generate events at a relatively high rate. Readout system 100 may have the capability to provide an address of the anodes 14 generating specific pulses, and energies of the pulses, arriving simultaneously at different anodes, e.g., as described in the '772 application.

In one example, readout system 100 may include an array of, e.g., similar, detector output units (not shown) corresponding to the array of anodes 14 and coupled to the m circuit outputs 50, e.g., as described in the '772 application. As described in the '772 application, each detector output unit may have an amplifier (not shown) that is able to hold an indication of a charge ("the indication"), generated by the anode receiving a photon, e.g., until the indication is read from the amplifier onto a readout line of the unit. As further described in the '772 application, each detector output unit may output a request-to-read (request) signal when the amplifier has the indication, and may receive a select-to-read (select) signal and use it to cause the indication to be read from the amplifier. In one example, one readout amplifier may be connected to all the readout lines of the array of units.

To form an event-driven readout system having an extremely fast readout time, the array of output units may be coupled to a set of selectors, e.g., all substantially similar, which are connected together in the form of a tree. The tree is arranged in rows, each row having fewer selectors than a preceding row. A final row of the tree may include a single final selector. A request signal from an output unit having the charge indication ("the origin unit") may be routed forward through the tree by the selectors to the final selector, and from the final selector to a processor. The processor may generate a select signal that is routed back, via the same selectors, to the origin unit. Upon receipt of the request signal, the processor may activate the readout amplifier, so that the charge indication on the origin unit may be read by the processor.

In addition to being configured to route the select signal along the same path as the request signal, the selectors may be configured to effectively queue request signals by acting as memory elements, to prioritize request signals so as to ensure that detector output units are read equitably, and/or to automatically register the address of the originating detector unit.

The description above assumed, by way of example, that each of the detector elements 14 receives on the order of $10^8$ events per second; and that each signal circuit 32 (FIG. 2) is capable of handling approximately $10^7$ events per second, e.g., as determined by the response time of the slowest element (shaper 44). According to this example, setting n to be approximately equal to 10, i.e., having 10 channels, may allow circuit 30 (FIG. 2) to distinguish between individual events. In a more general example, for anodes that receive F events per second, wherein each signal circuit is capable of handling S events per second, then the number of channels n allowing circuit 30 (FIG. 2) to distinguish between individual events may be approximated, for example, as follows:

$$n \approx \frac{F}{S} \quad (1)$$

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes.

We claim:

1. A photon counting radiation detection system comprising:
   at least one radiation detector including an array of anodes to generate a plurality of electrical signals in response to absorbing photons of ionizing radiation;
   an array of electrical signal detectors to read said plurality of electrical signals, wherein at least one of said electrical signal detectors includes:

two or more electrical signal readers, wherein each of said signal readers is individually switchable between a coupled state in which an input of the signal reader is coupled to said electrode, and a decoupled state in which said input is decoupled from said electrode; and a controller to detect said plurality of electrical signals, to selectively switch said two or more signal readers to said coupled state to receive at least one sequence of two or more of the detected electrical signals, respectively, and to selectively activate said two or more signal readers to process the two or more detected electrical signals, respectively; and a readout system to generate an output corresponding to said radiation based on an output of said array of electrical signal detectors.

2. The system of claim 1, wherein said controller is to detect a signal to be read by a first signal reader of said two or more signal readers, which is at said coupled state; and, at the end of a predefined time period after detecting said signal, to switch said first signal reader from said coupled state to said decoupled state and to switch a second signal reader of said two or more signal readers from said decoupled state to said coupled state.

3. The system of claim 2, wherein said controller is to deactivate said first signal reader at the end of a predefined time period after switching said first signal reader to said decoupled state.

4. The system of claim 2, wherein said controller is to activate said second signal reader at the end of a predefined switching time period after coupling said second signal reader.

5. The system of claim 1, wherein said two or more electrical signal readers include n readers, and wherein said controller is to cyclically switch said n signal readers to said coupled state according to a predefined switching sequence, such that each of said n readers is to sequentially read a first electrical signal of said sequence of electrical signals and a second electrical signal of a consecutive sequence of the detected electrical signals.

6. The system of claim 1, wherein a number of said two or more signal readers is equal to or greater than a ratio between a flux of the plurality of electrical signals received from said electrode and a reading time of each of said signal readers.

7. The system of claim 1, wherein at least one signal reader of said signal readers comprises a signal readout circuit including:

a charge-sensitive amplifier to be switchably coupled to said input via a switchable gate; and a shaper coupled to an output of said amplifier.

8. The system of claim 7, wherein a number of said two or more signal readers is equal to or greater than a ratio between a flux of the plurality of electrical signals received from said electrode and a time constant of said shaper.

9. The system of claim 1, wherein said two or more signal readers are coupled to a common output.

10. The system of claim 1 comprising a medical imaging system.

11. The system of claim 1, wherein said radiation comprises x-ray or Gamma radiation.

12. An apparatus to read a plurality of electrical signals received from an electrode, the apparatus comprising:

two or more electrical signal readers, wherein each of said signal readers is individually switchable between a coupled state in which an input of the signal reader is coupled to said electrode, and a decoupled state in which said input is decoupled from said electrode; and a controller to detect said plurality of electrical signals, to selectively switch said two or more signal readers to said coupled state to receive at least one sequence of two or more of the detected electrical signals, respectively, and to selectively activate said two or more signal readers to process the two or more detected electrical signals, respectively.

13. The apparatus of claim 12, wherein said controller is to detect a signal to be read by a first signal reader of said two or more signal readers, which is at said coupled state; and, at the end of a predefined time period after detecting said signal, to switch said first signal reader from said coupled state to said decoupled state and to switch a second signal reader of said two or more signal readers from said decoupled state to said coupled state.

14. The apparatus of claim 13, wherein said controller is to deactivate said first signal reader at the end of a predefined time period after switching said first signal reader to said decoupled state.

15. The apparatus of claim 13, wherein said controller is to activate said second signal reader at the end of a predefined switching time period after switching said second signal reader to said coupled state.

16. The apparatus of claim 12, wherein said two or more electrical signal readers include n readers, and wherein said controller is to cyclically switch said n signal readers to said coupled state according to a predefined switching sequence, such that each of said n readers is to sequentially read a first electrical signal of said sequence of electrical signals and a second electrical signal of a consecutive sequence of the detected electrical signals.

17. The apparatus of claim 16, wherein said first and second electrical signals are separated by n electrical signals.

18. The apparatus of claim 12, wherein a number of said two or more signal readers is equal to or greater than a ratio between a flux of the plurality of electrical signals received from said electrode and a reading time of each of said signal readers.

19. The apparatus of claim 12, wherein at least one signal reader of said signal readers comprises a signal readout circuit including:

a charge-sensitive amplifier to be switchably coupled to said input via a switchable gate; and a shaper coupled to an output of said amplifier.

20. The apparatus of claim 19, wherein a number of said two or more signal readers is equal to or greater than a ratio between a flux of the plurality of electrical signals received from said electrode and a time constant of said shaper.

21. The apparatus of claim 19, wherein said signal reader comprises a reset switch connected in parallel to said charge-sensitive amplifier, and wherein said controller is to switch said signal reader to said coupled state by closing said gate, and to activate said signal reader by opening said reset switch.

22. The apparatus of claim 12, wherein said two or more signal readers are coupled to a common output.

23. The apparatus of claim 12 comprising a radiation detector including an array of anodes, wherein said electrode comprises an anode of said array of anodes.

24. The apparatus of claim 23, wherein said radiation detector comprises a radiation detector to detect an ionizing radiation selected from the group consisting of X-ray radiation and Gamma ray radiation.

25. The apparatus of claim 23, wherein said radiation detector comprises a single photon counting semiconductor radiation detector.

26. The apparatus of claim 25, wherein said semiconductor radiation detector comprises cadmium zinc telluride.

27. A method of reading a plurality of electrical signals received from an electrode of a radiation detector, the method comprising:

demote detecting said plurality of electrical signal; and individually reading at least one sequence of two or more of the detected electrical signals by two or more electrical signal readers, respectively, by selectively switching said two or more electrical signal readers between a coupled state in which an input of the signal reader is coupled to said electrode and a decoupled state in which said input is decoupled from said electrode, and selectively activating said two or more signal readers to process said two or more detected signals, respectively.

28. The method of claim 27 comprising detecting a signal to be read by a first signal reader of said two or more signal readers, which is at said coupled state; and, at the end of a predefined time period after detecting said signal, switching said first signal reader from said coupled state to said decoupled state and switching a second signal reader of said two or more signal readers from said decoupled state to said coupled state.

29. The method of claim 28 comprising deactivating said first signal reader at the end of a predefined time period after switching said first signal reader to said decoupled state.

30. The method of claim 28 comprising activating said second signal reader at the end of a predefined switching time period after switching said second signal reader to said coupled state.

31. The method of claim 27, wherein said two or more electrical signal readers include n readers, and wherein said selectively switching comprises cyclically switching said n signal readers to said coupled state according to a predefined switching sequence, such that each of said n readers is to sequentially read a first electrical signal of said sequence of electrical signals and a second electrical signal of a consecutive sequence of the detected electrical signals.

32. The method of claim 31, wherein said first and second electrical signals are separated by n electrical signals.

33. The method of claim 27, wherein a number of said two or more signal readers is equal to or greater than a ratio between a flux of the plurality of electrical signals received from said electrode and a reading time of each of said signal readers.

34. The method of claim 27, wherein said reading comprises using a shaper, and wherein a number of said two or more signal readers is equal to or greater than a ratio between a flux of the plurality of electrical signals received from said electrode and a time constant of said shaper.

35. The method of claim 27, wherein said electrode comprises an anode of an array of anodes of a radiation detector.

36. The method of claim 35, wherein said radiation detector comprises a single photon counting semiconductor radiation detector.

37. The method of claim 36, wherein said semiconductor radiation detector comprises cadmium zinc telluride.

* * * * *